United States Patent

Jansson et al.

[11] Patent Number: 6,109,366
[45] Date of Patent: Aug. 29, 2000

[54] POWER TOOL WITH LUBRICATED ANGLE DRIVE

[75] Inventors: Anders Urban Jansson, Älvsjö; Jan Conny Heiskanen, Årsta, both of Sweden

[73] Assignee: Atlas Copco Tools AB, Nacka, Sweden

[21] Appl. No.: 09/025,065

[22] Filed: Feb. 17, 1998

[30] Foreign Application Priority Data

Feb. 19, 1997 [SE] Sweden .................................. 9700579

[51] Int. Cl.[7] ......................................................... F16N 7/04
[52] U.S. Cl. .......................... 173/216; 173/104; 173/213; 173/DIG. 3; 184/6.14
[58] Field of Search ..................................... 173/216, 217, 173/104, 105, DIG. 3, 197, 198, 199, 213, 171; 184/6.14, 5, 64, 106, 69, 102

[56] References Cited

U.S. PATENT DOCUMENTS

| | | |
|---|---|---|
| 3,719,254 | 3/1973 | Snider . |
| 4,183,414 | 1/1980 | Tamai et al. .............................. 184/64 |
| 4,190,116 | 2/1980 | O'Neal et al. ........................... 173/213 |
| 4,403,679 | 9/1983 | Snider . |
| 4,416,337 | 11/1983 | Phillips et al. ..................... 173/DIG. 3 |
| 4,576,240 | 3/1986 | Matsumoto ............................. 173/105 |
| 5,293,959 | 3/1994 | Kimberlin ............................. 184/6.14 |

FOREIGN PATENT DOCUMENTS

| | | |
|---|---|---|
| 0291370 A1 | 11/1988 | European Pat. Off. . |
| 1911612 | 9/1970 | Germany . |
| 3529028 A1 | 3/1986 | Germany . |

*Primary Examiner*—Scott A. Smith
*Attorney, Agent, or Firm*—Frishauf, Holtz, Goodman, Langer & Chick, P.C.

[57] ABSTRACT

A power tool with a rotation motor, a rotating output shaft (26), and an angle drive (11) connecting the motor to the output shaft (26) and comprising a gear casing (12), a pinion gear (14) connected to the motor, a crown wheel (17) connected to the output shaft (26), and a lubricant dispensing device including a receptacle (28) immovably supported in the gear casing (12) and having a peripheral side wall (30,31) and an end wall (29), wherein the end wall (29) is formed with a through opening (43) for the output shaft (26) and an outlet opening (43) for the lubricant, and an agitator element (44) is freely movable within the receptacle (28) for agitating the lubricant by vibratory movements during operation of the tool, thereby facilitating spreading of the lubricant toward the outlet opening (43).

34 Claims, 1 Drawing Sheet

POWER TOOL WITH LUBRICATED ANGLE DRIVE

BACKGROUND OF THE INVENTION

The invention relates to a power tool of the type having a rotation motor drivingly connected to an output shaft via an angle drive.

In particular, the invention concerns a power tool of the above type in which the angle drive comprises a gear casing, a bevelled pinion gear connected to the motor, a bevelled crown wheel connected to the outout shaft and intermeshing with the pinoin gear, and a lubricant dispensing means located in the gear casing and arranged to provide a lubricant to the angle drive.

A problem inherent in many angle type power tools, like rotation grinding or cutting tools, relates to the limited service life of the angle gear. This is mainly due to an insufficient lubrication of the gear teeth of the pinion gear and crown wheel, resulting in a severe frictional wear and heat development in the gearing.

Previously, lubrication of the angle gear has been accomplished simply by filling the gear casing from new with a certain amount of grease and adding some more grease after certain operation intervals. This, however, has turned out to be less satisfactory, because after a relatively short time of tool operation the heavier components of the grease, i.e. the components of higher viscosity, are deposited on the gear casing walls, whereas the lighter components, i.e. the components of lower viscosity, tend to leak out from the gear casing through the output shaft seal means. Such a leakage is larger in pneumatic power tools, because in those tools there is always a certain superatmospheric pressure prevailing in the angle gear casing.

The above problems means that the lubrication intervals have to be rather short not to risk dry operation of the angle gear. It has to be observed, though, that too large an amount of grease in the gear casing will cause a detrimental overheating of the grease as well as the entire angle gear due to internal friction or hysteresis in the grease.

Previous attempts have been made to solve this problem by providing different types of lubricant dispensing means. In U.S. Pat. No. 3,719,254 there is described a power tool angle drive in which a lubricant reservoir is mounted on the output shaft for corotation therewith. This reservoir encloses an absorbent sleeve element which is soaked with a lubricant of a relatively low viscosity and which is arranged to dispense that lubricant by centrifugal action onto the gear teeth at operation of the tool. A drawback with this known device is the limitation in size of the reservoir. Its radial dimension is limited to the space available between the output shaft and the end surface of the pinion gear. The reservoir could of course be extended axially, but that would result in undesireable increased outer dimensions of the angle head. A small size lubricant reservoir results in shorter lubrication intervals.

Another previously suggested solution to the angle drive lubrication problem is described in U.S. Pat. No. 4,403,679. The angle drive disclosed in this patent comprises an absorbent sleeve element immovably mounted in the gear casing surrounding the output shaft. This sleeve, which comprises two portions of different absorption properties, is initially saturated with a lubricant and arranged to meter that lubricant onto the gear teeth of the crown wheel by gravitation. A drawback with this device is that a lubricant with noimparatively low viscosity has to be used. This means in turn that also when the tool is temporarily out of use or stored for a shorter or longer period of time the lubricant is dispensed continuously from the absorbent sleeve. Thereby, the lubricant may be gathered somewhere in the gear casing where it will not be effective to lubricate the gear when the tool is put back in use.

The above identified problem as well as the drawbacks of the previously described devices are overcome by the power tool according to the invention as it is defined in the claims.

A preferred embodiment of the invention is described below with reference to the accompanying drawings.

DETAILED DESCRIPTION

Figure 1:
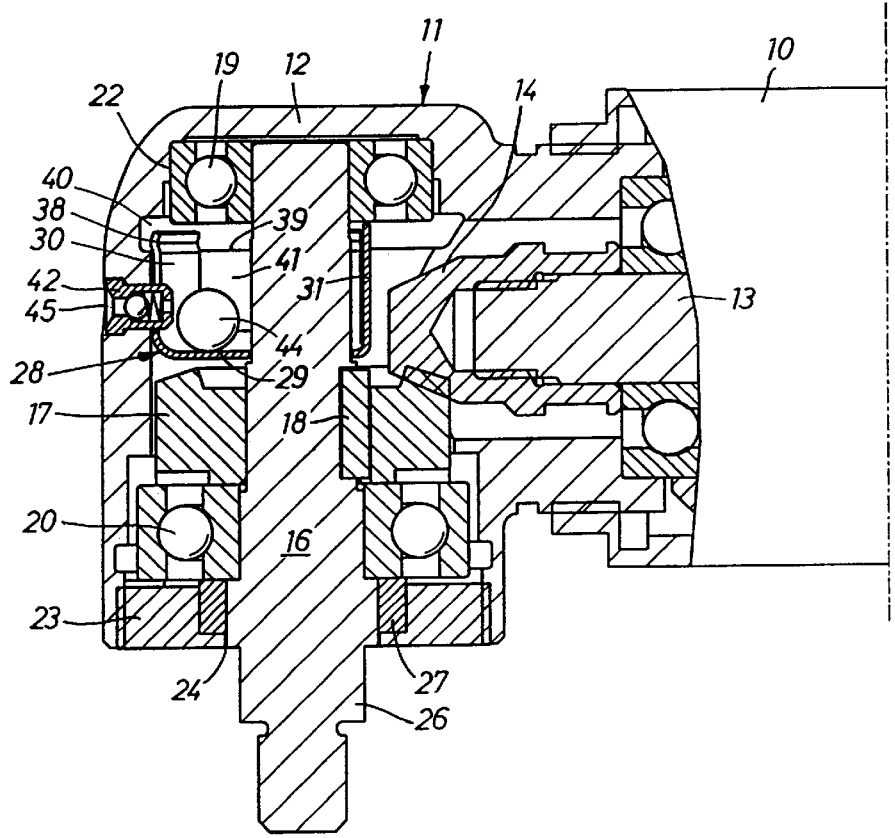
FIG. 1 shows a longitudinal section through a power tool angle drive head according to the invention.

The power tool shown in FIG. 1 comprises a housing 10, a rotation motor (not shown), and an angle gear 11. The latter is located in a gear casing 12 attached to the housing 10 and includes a pinion shaft 13 drivingly coupled to the motor, a pinion gear 14, and an output shaft 16. A crown wheel 17 is locked to the output shaft 16 by a key 18 and intermeshes with the pinion gear 14.

The output shaft 16 is journalled in a rear bearing 19 and a forward bearing 20, whereof the rear bearing 19 is supported in a socket portion 22 in the gear casing 12 and the forward bearing 20 is axially supported by a threaded ring element 23 forming an end closure of the gear casing 12. The ring element 23 has a central opening 24 through which a drive end 26 of the output shaft 16 protrudes from the gear casing 12, and a seal ring 27 is carried on the ring element 23 for sealing off the opening 24 around the output shaft 16. The drive end 26 of the output shaft 16 is adapted to carry any standard type working implement, for instance a grinding tool.

Figure 2:
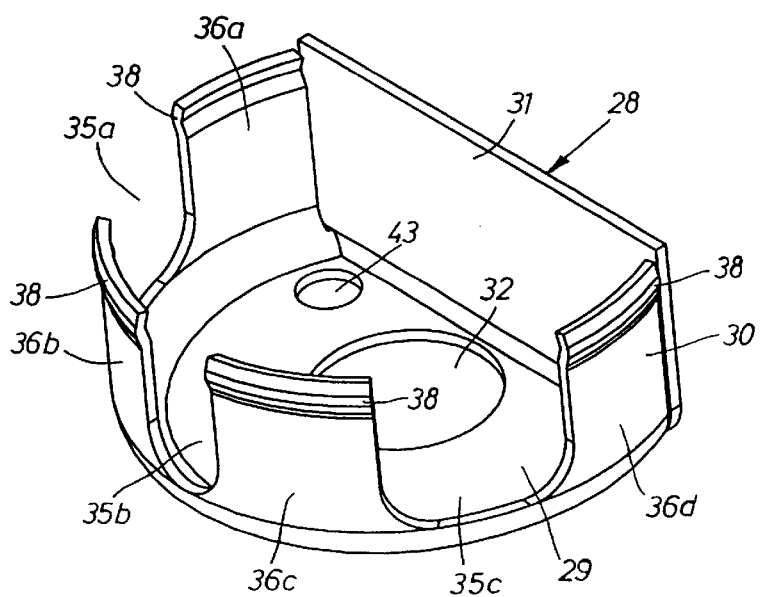
FIG. 2 shows a perspective view of the lubricant reservoir comprised in the angle drive shown in FIG. 1.

In the gear casing 12, between the rear bearing 19 and the crown wheel 17, there is mounted a cup-shaped lubricant receptacle 28 having an end wall 29 and a peripheral side wall. The latter comprises a cylindriceal section 30 and a flat section 31. The end wall 29 is flat and has a circular opening 32 through which the output shaft 16 extends,. See FIG. 2. The receptacle 28 is intended to be located with the end wall 29 close to the crown wheel 17 and with the flat side wall section 31 opposite the end surface of the pinion gear 14. See FIG. 1.

The cylindrical side wall section 30 is divided by slots or openings 35a, 35b and 35c into four axially directed tongues or fingers 36a, 36b, 36c and 36d, each formed at its free upper end with an external circumferentially directed rib 38. The latter is intended to cooperate by a snap-action with a circumferential shoulder 39 in the gear casing 12 to axially lock the receptacle 28 in the gear casing 12. The shoulder 39 is formed by a part-circumferential groove 40 in the gear casing 12. The flat side wall section 34 is not connected to the adjacent tongues 36a, 36d of the cylindrical wall section 30, but leaves the tongues 36a, 36b free to be elastically bent to ensure the snap-action between the ribs 38 and the shoulder 39.

When properly mounted in the gear casing 12, the slots 35a–c of the cylindrical side wall section 30 are fully covered by a surrounding inner wall 41 of the gear casing 12 to make the receptacle 28 fully cup-shaped. By means of a lubricator fitting 42 mounted in a lateral opening 45 in the gear casing 12 and extending into the receptacle 28 via one of the slots 35b in the side wall, the receptacle 28 may be filled up with a lubricant. In its end wall 29, the receptacle 28 is provided with a small size opening 43 through which lubricant is dispensed mainly by gravity onto the crown wheel 17. For making the lubricant reach the opening 43, there is provided an agitator element in the form of a freely movable metal ball 44. Due to vibrational and other movements of the tool housing 10 and gear casing 12 during operation of the tool, the ball 44 moves around in the receptacle 28 agitating the lubricant and makes the lubricant move in several directions, inter alia in the direction of the outlet opening 43.

During operation of the tool, the lubricant is dispensed from the receptacle 28 via the opening 43 onto the gear teeth of the crown wheel 17 to lubricate the angle gear 11. However, the lubricant does not stay on the gear teeth but is thrown off by centrifugal action and is also separated by the rather violent agitation of the gear teeth into its heavier and lighter components. The heavier components, which have a higher viscosity, are deposited on the walls of the gear casing 12, whereas the lighter components, which have a lower viscosity, tend to leak out from the gear casing 12 past the output shaft seal ring 27. At certain service intervals, more lubricant has to be added through the fitting 42 to compensate for the deposited and leaked lubricant initial supplied to the receptacle 28. After a certain number of service intervals, the angle gear has to be dismantled and cleaned from all the deposited heavier lubricant components gathered on the gear casing walls during operation.

The invention is not limited to the shown and described example but may be varied within the scope of the claims. For instance, the lubricant receptacle 28 may be made of any suitable material like sheet metal or plastic, and the side wall tongues 36a–d of the receptacle 28 may be varied in number and configuration. Neither is the invention restricted to a device having an agitator element in the form of a ball 44. There may also be more than one agitator element. There may also be more than one lubricant outlet opening 43. Accordingly, it is obvious that the number and configuration of the agitator element as well as the location and size of the lubricant outlet may be varied in response to the viscosity properties of the actual type of lubricant.

What is claimed is:

1. Power tool with a rotation motor, a rotating output shaft (26) and an angle drive (11) connecting said motor to said output shaft (26), said angle drive (11) including a gear casing (12), a pinion gear (14) connected to said motor, a crown wheel (17) connected to said output shaft (26), and a lubricant dispenser (28, 44) located in said gear casing (12) and arranged to provide a lubricant to said angle drive (11), wherein said lubricant dispenser (28, 44) includes a lubricant receptacle (28) immovably supported in said gear casing (12), said receptacle (28) comprising a peripheral side wall (30, 31) extending substantially in parallel with said output shaft (26) and an end wall (29) disposed substantially transversely to said side wall (30, 31) and to said output shaft (26), said end wall (29) being located close to said crown wheel (17) and including a lubricant outlet opening (43), at least one agitator element (44) which is freely movable within said receptacle (28) and arranged to agitate said lubricant under the action of tool operation related vibratory movements of said gear casing (12), thereby, facilitating spreading of said lubricant toward said outlet opening (43).

2. Power tool according to claim 1, wherein said gear casing (12) is provided with a laterally extending passage (42) for enabling refilling of said receptacle from an external lubricant source.

3. Power tool according to claim 2, wherein said peripheral side wall (30, 31) of said receptacle (28) is provided with a lubricant inlet opening (35b), and said passage (42) of said gear casing (12) is located so as to coincide with said lubricant inlet opening (42).

4. Power tool according to claim 3, wherein said at least one agitator element (44) comprises a metal ball.

5. Power tool according to claim 4, wherein said receptacle (28) is cup-shaped and having its peripheral side wall (30, 31) divided by slots (35a–c) into a number of axially directed tongues (36a–d), each formed at its free end with an external circumferentially directed rib (38) intended for cooperation by snap-action with a corresponding shoulder (39) in said gear casing (12) to axially lock said receptacle (28) in said gear casing (12).

6. Power tool according to claim 5, wherein one of said slots (35b) forms said lubricant inlet opening.

7. Power tool according to claim 6, wherein a lubricant supply fitting (45) is mounted in said gear casing passage (42), said fitting (45) extends into said lubricant inlet opening (35b) of said receptacle (38) to thereby form a rotation lock for said receptacle (28).

8. Power tool according to claim 5, wherein a lubricant supply fitting (45) is mounted in said gear casing passage (42), said fitting (45) extends into said lubricant inlet opening (35b) of said receptacle (38) to thereby form a rotation lock for said receptacle (28).

9. Power tool according to claim 4, wherein a lubricant supply fitting (45) is mounted in said gear casing passage (42), said fitting (45) extends into said lubricant inlet opening (35b) of said receptacle (38) to thereby form a rotation lock for said receptacle (28).

10. Power tool according to claim 3, wherein said receptacle (28) is cup-shaped and having its peripheral side wall (30, 31) divided by slots (35a–c) into a number of axially directed tongues (36a–d), each formed at its free end with an external circumferentially directed rib (38) intended for cooperation by snap-action with a corresponding shoulder (39) in said gear casing (12) to axially lock said receptacle (28) in said gear casing (12).

11. Power tool according to claim 10, wherein one of said slots (35b) forms said lubricant inlet opening.

12. Power tool according to claim 11, wherein a lubricant supply fitting (45) is mounted in said gear casing passage (42), said fitting (45) extends into said lubricant inlet opening (35b) of said receptacle (38) to thereby form a rotation lock for said receptacle (28).

13. Power tool according to claim 10, wherein a lubricant supply fitting (45) is mounted in said gear casing passage (42), said fitting (45) extends into said lubricant inlet opening (35b) of said receptacle (38) to thereby form a rotation lock for said receptacle (28).

14. Power tool according to claim 2, wherein said at least one agitator element (44) comprises a metal ball.

15. Power tool according to claim 14, wherein said receptacle (28) is cup-shaped and having its peripheral side wall (30, 31) divided by slots (35a–c) into a number of axially directed tongues (36a–d), each formed at its free end with an external circumferentially directed rib (38) intended for cooperation by snap-action with a corresponding shoulder (39) in said gear casing (12) to axially lock said receptacle (28) in said gear casing (12).

16. Power tool according to claim 15, wherein one of said slots (35b) forms said lubricant inlet opening.

17. Power tool according to claim 16, wherein a lubricant supply fitting (45) is mounted in said gear casing passage (42), said fitting (45) extends into said lubricant inlet opening (35*b*) of said receptacle (38) to thereby form a rotation lock for said receptacle (28).

18. Power tool according to claim 15, wherein a lubricant supply fitting (45) is mounted in said gear casing passage (42), said fitting (45) extends into said lubricant inlet opening (35*b*) of said receptacle (38) to thereby form a rotation lock for said receptacle (28).

19. Power tool according to claim 14, wherein a lubricant supply fitting (45) is mounted in said gear casing passage (42), said fitting (45) extends into said lubricant inlet opening (35*b*) of said receptacle (38) to thereby form a rotation lock for said receptacle (28).

20. Power tool according to claim 2, wherein said receptacle (28) is cup-shaped and having its peripheral side wall (30, 31) divided by slots (35*a–c*) into a number of axially directed tongues (36*a–d*), each formed at its free end with an external circumferentially directed rib (38) intended for cooperation by snap-action with a corresponding shoulder (39) in said gear casing (12) to axially lock said receptacle (28) in said gear casing (12).

21. Power tool according to claim 20, wherein a lubricant supply fitting (45) is mounted in said gear casing passage (42), said fitting (45) extends into said lubricant inlet opening (35*b*) of said receptacle (38) to thereby form a rotation lock for said receptacle (28).

22. Power tool according to claim 1, wherein said at least one agitator element (44) comprises a metal ball.

23. Power tool according to claim 22, wherein said receptacle (28) is cup-shaped and having its peripheral side wall (30, 31) divided by slots (35*a–c*) into a number of axially directed tongues (36*a–d*), each formed at its free end with an external circumferentially directed rib (38) intended for cooperation by snap-action with a corresponding shoulder (39) in said gear casing (12) to axially lock said receptacle (28) in said gear casing (12).

24. Power tool according to claim 23, wherein one of said slots (35*b*) forms said lubricant inlet opening.

25. Power tool according to claim 24, wherein a lubricant supply fitting (45) is mounted in said gear casing passage (42), said fitting (45) extends into said lubricant inlet opening (35*b*) of said receptacle (38) to thereby form a rotation lock for said receptacle (28).

26. Power tool according to claim 23, wherein a lubricant supply fitting (45) is mounted in said gear casing passage (42), said fitting (45) extends into said lubricant inlet opening (35*b*) of said receptacle (38) to thereby form a rotation lock for said receptacle (28).

27. Power tool according to claim 22, wherein a lubricant supply fitting (45) is mounted in said gear casing passage (42), said fitting (45) extends into said lubricant inlet opening (35*b*) of said receptacle (38) to thereby form a rotation lock for said receptacle (28).

28. Power tool according to claim 1, wherein said receptacle (28) is cup-shaped and having its peripheral side wall (30, 31) divided by slots (35*a–c*) into a number of axially directed tongues (36*a–d*), each formed at its free end with an external circumferentially directed rib (38) intended for cooperation by snap-action with a corresponding shoulder (39) in said gear casing (12) to axially lock said receptacle (28) in said gear casing (12).

29. Power tool according to claim 28, wherein one of said slots (35*b*) forms said lubricant inlet opening.

30. Power tool according to claim 29, wherein one of said slots (35*b*) forms said lubricant inlet opening.

31. Power tool according to claim 30, wherein a lubricant supply fitting (45) is mounted in said gear casing passage (42), said fitting (45) extends into said lubricant inlet opening (35*b*) of said receptacle (38) to thereby form a rotation lock for said receptacle (28).

32. Power tool according to claim 29, wherein a lubricant supply fitting (45) is mounted in said gear casing passage (42), said fitting (45) extends into said lubricant inlet opening (35*b*) of said receptacle (38) to thereby form a rotation lock for said receptacle (28).

33. Power tool according to claim 28, wherein a lubricant supply fitting (45) is mounted in said gear casing passage (42), said fitting (45) extends into said lubricant inlet opening (35*b*) of said receptacle (38) to thereby form a rotation lock for said receptacle (28).

34. Power tool according to claim 1, wherein a lubricant supply fitting (45) is mounted in said gear casing passage (42), said fitting (45) extends into said lubricant inlet opening (35*b*) of said receptacle (28) to thereby form a rotation lock means for said receptacle (28).

* * * * *